United States Patent [19]

Meek et al.

[11] Patent Number: 5,060,202

[45] Date of Patent: Oct. 22, 1991

[54] METHOD FOR REMOVING COHERENT NOISE FROM SEISMIC DATA THROUGH T-K FILTERING

[75] Inventors: Robert A. Meek, Sanger; Andrew F. Linville, Jr., Dallas, both of Tex.

[73] Assignee: Mobil Oil Corporation, Fairfax, Va.

[21] Appl. No.: 637,424

[22] Filed: Jan. 4, 1991

[51] Int. Cl.$^5$ .......................... G01V 1/28; G01V 1/36
[52] U.S. Cl. ....................................... 367/45; 367/49; 364/421
[58] Field of Search .................. 367/45, 46, 49, 74; 364/223.9, 421, 924.5; 381/71

[56] References Cited

U.S. PATENT DOCUMENTS

| | | | |
|---|---|---|---|
| 4,218,765 | 8/1980 | Kinkade | 367/45 |
| 4,380,059 | 4/1983 | Ruehle | 367/46 |
| 4,594,693 | 6/1986 | Pann et al. | 367/43 |
| 4,853,903 | 8/1989 | Linville, Jr. et al. | 367/46 |

OTHER PUBLICATIONS

Benoliel et al., "Frequency Wavenumber Approach . . . Processing", Gegrbys. Prosp., vol. 35, #5, pp. 517-538, 6/87.
Anderson et al., "Noise-Adaptor Filtering of Seismic/-Hot Records", 57th Annu. SBG Int. Mtg., 10/15/87, pp. 479-482, Pap. No. 54-3.
Hu et al., "Wave-Field Transformations . . . Profiles", Gegrbysios,, vol. 52, #3, pp. 307-321, 3/87.
Huang et al., "Born Migration . . . Wavenumber-Time Domain", 60th Annu. SLG Int. Mtg., 9/27/90, vol. 2, pp. 1136-1139, Pap. No. SI 1-8.

Primary Examiner—Nelson Moskowitz
Attorney, Agent, or Firm—Alexander J. McKillop; Charles J. Speciale; George W. Hager, Jr.

[57] ABSTRACT

In seismic exploration, seismic reflection from subsurface formations are recorded in the form of a time-distance of seismic traces. This array is transformed into a time-wavenumber domain. Wavenumbers at which coherent noise resides within the time-wavenumber domain are determined. Frequencies corresponding to such wavenumbers are removed by filtering. The frequency-filtered, time-wavenumber domain of seismic traces are then transformed back into a time-distance array of seismic traces.

8 Claims, 5 Drawing Sheets

METHOD FOR REMOVING COHERENT NOISE FROM SEISMIC DATA THROUGH T-K FILTERING

BACKGROUND OF THE INVENTION

This invention relates to seismic exploration and more particularly to a method of filtering for removing coherent noise from seismic traces. In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a known time and location, the recorded data can be processed by a computer in known ways to produce an image of the subsurface. The image thus produced is commonly interpreted by geophysicists to detect the possible presence of valuable hydrocarbons.

Seismograms are commonly recorded as digital samples representing the amplitude of a received seismic signal as a function of time. Since seismograms are usually obtained along a line of exploration on the surface of the earth, the digital samples can be formed into an array (t-x) with each sample in the array representing the amplitude of the seismic signal as a function of time (t) and horizontal distance (x). When such arrays are visually reproduced, by plotting or the like, seismic sections are produced. A seismic section depicts the subsurface layering of a section of the earth. It is the principal tool which the geophysicist studies to determine the nature of the earth's subsurface formation. Before an array of seismic samples or traces can be converted into a seismic section for interpretation by geophysicists, however, the array must be extensively processed to remove noise and make reflection events discernable.

In the processing of seismograms, t-x arrays are sometimes transformed into arrays of complex numbers as a function of frequency (f) and wavenumber (k). This is commonly referred to as a "frequency-wavenumber" or "f-k" transformation. The f-k transformation has been used as a tool to study and filter seismic data. F-k transforms are routinely used to represent data collected by large arrays of sensors, including seismic data. Usually the f-k representations are computed by fast Fourier transforms. The resulting data representations are parameterized by frequencies, wavenumbers (spatial frequencies), amplitudes, and phases. In particular, for each frequency there is a collection of wavenumbers, and for each frequency-wavenumber pair there is a complex number (an amplitude and a phase). Among various applications of this representation are spectrum analysis (displaying the amplitude squared as a function of frequency and wavenumber) and filtering in the frequency-wavenumber domain. F-k spectrum analysis and filtering are particularly important when seismic data are contaminated by large amplitude coherent noise which obscures geologically significant signals. Frequently the coherent noise occupies a different part of the f-k spectrum than the signals. In such cases f-k filtering can potentially be used to attenuate the coherent noise thus revealing the signals for interpretation.

In U.S. Pat. No. 4,218,765 to Kinkade, seismic traces are transformed to an f-k array and filtering is performed on the traces in the f-k domain. In U.S. Pat. No. 4,380,059 to Ruehle, multiple reflections are filtered from seismograms by transforming them into an f-k array representing amplitude as function of frequency and wavenumber. In Ruehle, the f-k array of the seismograms is filtered by weighting all samples with the inverse of the f-k transform of the multiple reflections. In U.S. Pat. No. 4,594,693 to Pann et al, seismic trace interpolation is carried out by inserting zero amplitude traces between the seismic traces in a section where spatial aliasing is a problem. The traces are then transformed into an f-k array. The f-k array is filtered to reject samples in a region of frequency and wavenumber which exhibits aliasing. The filtered f-k array is then transformed back into a seismic section representing amplitude as a function of time and distance. While f-k filtering is a very effective means of attenuating coherent noise from seismic traces, it is not the most optimal method in the sense of optimally preserving signal and rejecting noise. Taper zones between the noise and signal in the f-k domain have to be chosen by the geophysicist. If the taper zone is too small sidelobes will appear in the filtered seismic traces. If the taper zone is too large signal may be removed as well as the coherent noise or the coherent noise will not be significantly removed.

It is, therefore, an object of the present invention to provide for a new and improved method of filtering seismic traces to remove coherent noise that overcomes limitations present in f-k filtering methods.

SUMMARY OF THE INVENTION

In accordance with the present invention there is provided a method of filtering which removes coherent noise from seismic traces and operates in the (t-k) domain. In the t-k filtering method the time-distance samples for each time are Fourier transformed across distance into the time-wavenumber (t-k) domain. For each wavenumber the data now consists of complex temporal samples. A complex filter operator is then designed to remove a particular frequency of the noise at each wavenumber position. This operator is convolved with the temporal series resulting in the attenuation of a frequency-wavenumber component of the noise. Because linear noise has a constant phase velocity the frequency components of the noise can be directly computed for each wavenumber. In the case of dispersive noise a curve following the noise train must be digitized across the f-k spectrum of the data. In either case the filter continues from negative to positive wavenumbers removing the frequency components of the noise. After this operation is complete each filtered spatial series is inverse Fourier transformed back into the time-distance domain.

The choice of using the t-k domain for filtering is based on the coherent noise characteristic as observed in the f-k domain. When the frequency of the noise characteristic is changing slowly with wavenumber (low phase velocity) the t-k filtering method is particularly useful.

DETAILED DESCRIPTION OF THE INVENTION

Figure 1:
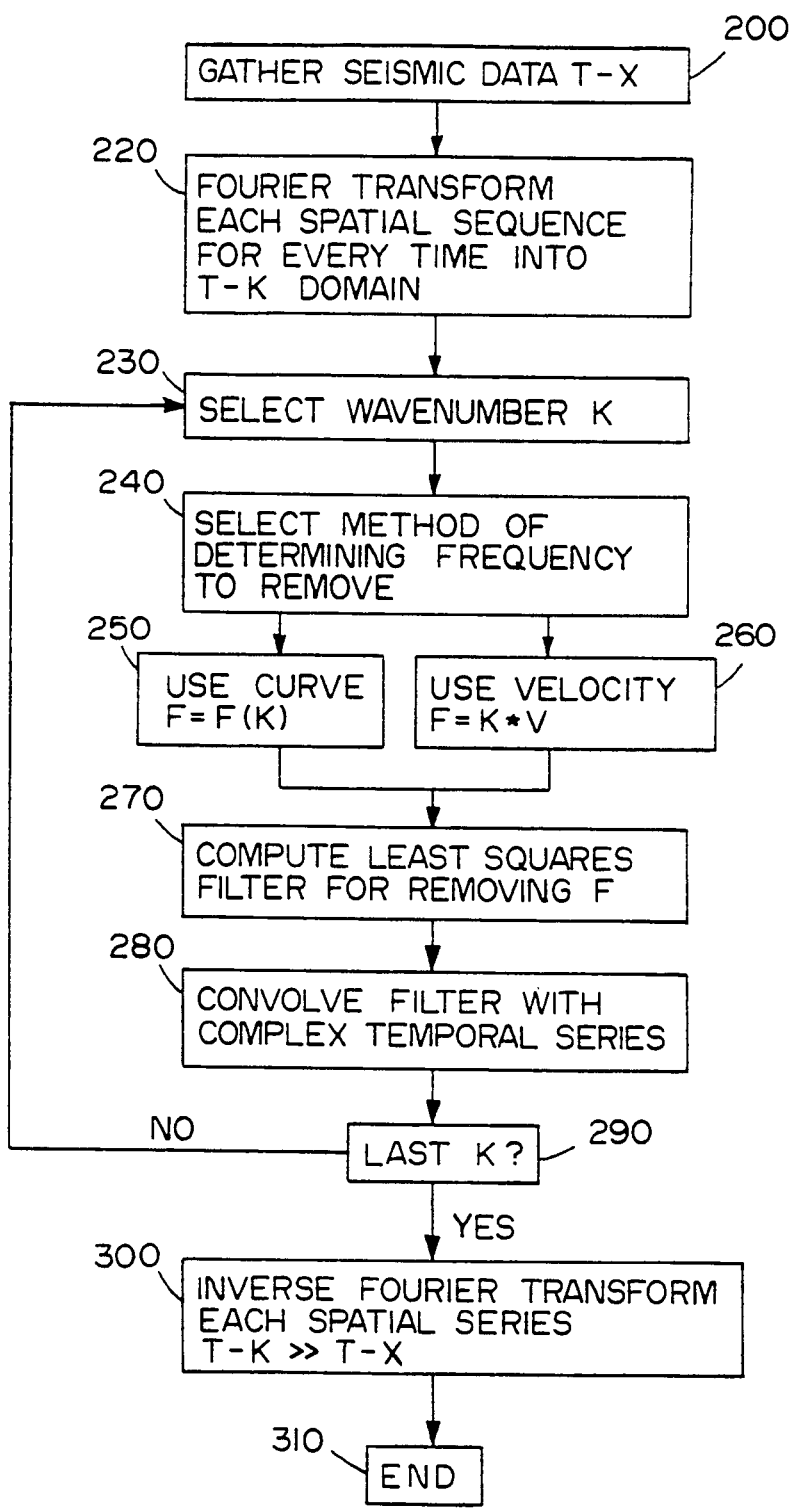
FIG. 1 illustrates, in flow chart form, the method of removing coherent noise from seismic data.
Figure 2:
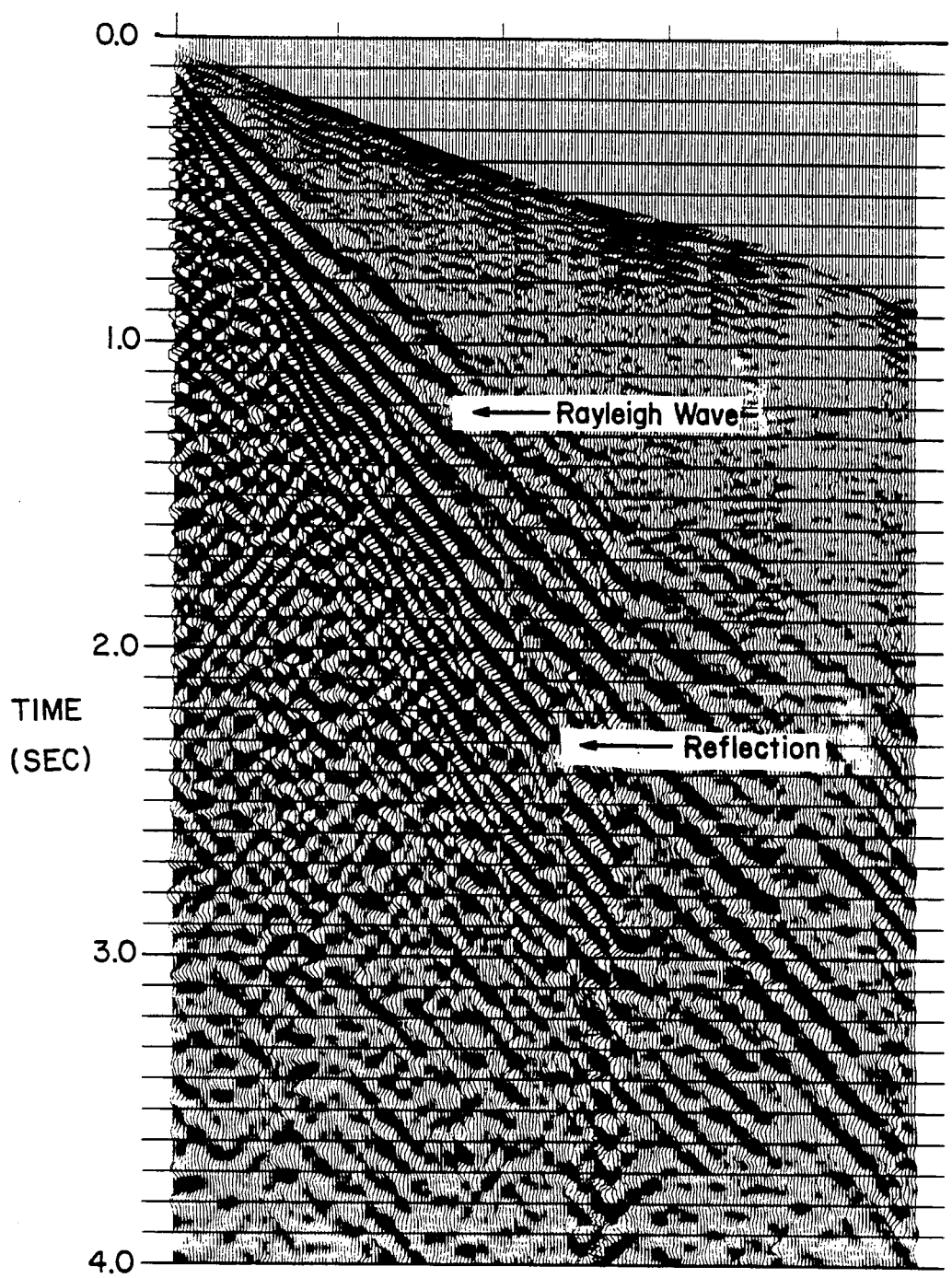
FIG. 2 illustrates a t-x domain shot record produced by conventional seismic exploration. The shot record contains coherent ground roll noise and reflection signals.

Referring first to FIG. 1 the method of removing coherent noise from a series of seismic traces is described. The method commences at step 200 with the acquisition of seismic data using any one of numerous well-known seismic exploration techniques. For example, an artificial disturbance may be generated along the earth by the use of dynamite or the like. The resulting acoustic waves travel downwardly in the earth and are reflected upward from subsurface reflecting interfaces. The reflected waves are received at geophones or other detectors located along the surface and recorded in reproducible form as seismograms. Often surface waves traveling from the shot to the geophones are also recorded along with the reflected waves. These surface waves are considered coherent noise and would have to be removed to observe the reflected waves. Seismic traces which would be acquired by a typical seismic survey may be seen by reference to FIG. 2. The seismic traces depicted in FIG. 2 represent the amplitude of seismic energy as a function of time and distance along a line of exploration in the x direction of the earth's surface. These traces have been gathered into a t-x array commonly referred to as a "seismic record" or "shot record".

Figure 3:
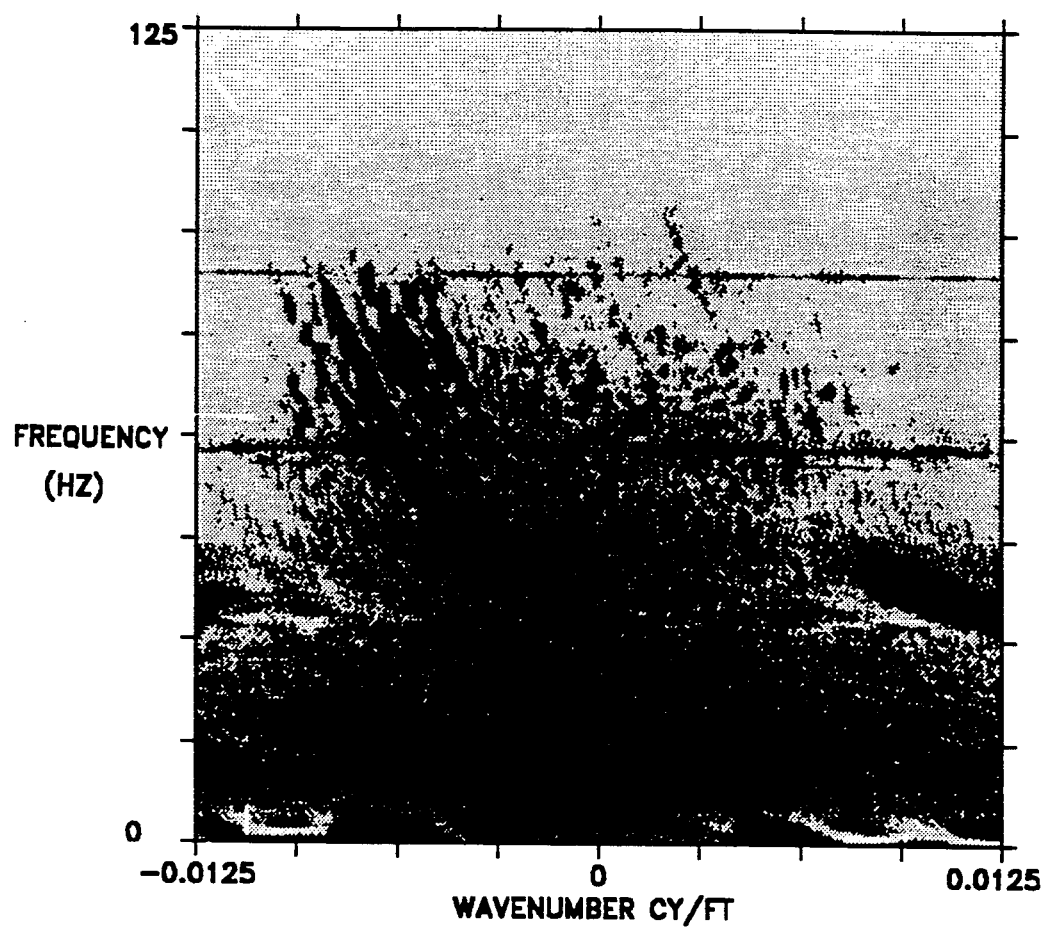
FIG. 3 illustrates an f-k spectrum of the t-x domain shot record in FIG. 2.

Use of the method of t-k filtering depends on the structure of the coherent noise in the f-k domain. If the noise has a low velocity (low slope in the f-k domain) the t-k filtering method is particularly useful. A typical f-k spectrum of a shot record is shown in FIG. 3. Reflection signals occur along the wavenumber k=0. The coherent noise in the form of Rayleigh waves occurs as the curved energy between 8 Hz and 20 Hz. Because the coherent noise has, in this case, a low slope in the f-k domain, the t-k method of filtering should be chosen.

Proceeding to step 220 the gathered seismic data d(t,x) is transformed into the t-k domain D(t,k) using a Fast Fourier Transform algorithm in accordance with the following equation:

$$D(t,k) = \sum_{x=0}^{n-1} d(t,x)e^{-i2\pi kx/n} \quad (1)$$

where d(t,x) are the seismic traces in the t-x domain for x=1 ... n, where n is the number of seismic traces; t=0, ..., j; and j is the number of time samples. D(t,k) are the seismic traces in the t-k domain, where k=0 ... n.

At step 230 a wavenumber between a lower wavenumber and an upper wavenumber where the noise resides is selected. This wavenumber range depends on the bandwidth of the coherent noise. For example, in FIG. 3 the coherent noise resides between the wavenumbers -0.00875 cy/ft and 0.00625 cy/ft. The filtering method would select all wavenumbers between these two values to perform the filtering operation.

At step 240 the method of determining what frequency of the noise to remove is selected. If the coherent noise is curved in the f-k domain (dispersive) the method proceeds to step 250, where the frequency corresponding to the coherent noise at wavenumber k is chosen from a stored table of frequencies f(k). A table f(k) following the trend of the noise will have been previously digitized from the f-k spectrum of the seismic record. For example, in FIG. 3 the table f(k) would be chosen such that it follows the curved Rayleigh wave energy. If the coherent noise is linear in the f-k domain (has a constant velocity) the method proceeds to step 260, where the frequency would be calculated from the formula f=kv where k is the wavenumber, f is the frequency and v is the velocity of the coherent noise.

Proceeding to step 270 the least squares filter a(m) is designed to remove the frequency f from the wavenumber series D(t,k) in accordance with the following equation:

$$\begin{bmatrix} R(0) + \sigma^2 & R^*(1) & \ldots & R^*(p-1) \\ R(1) & R(0) + \sigma^2 & \ldots & R^*(p-2) \\ . & . & & . \\ . & . & & . \\ . & . & & . \\ R(p-1) & R(p-1) & \ldots & R(0) + \sigma^2 \end{bmatrix} \begin{bmatrix} a(0) \\ a(1) \\ . \\ . \\ . \\ a(p-1) \end{bmatrix} = \begin{bmatrix} 1 \\ 0 \\ . \\ . \\ . \\ 0 \end{bmatrix} \quad (2)$$

where * means complex conjugate, $R(m) = e^{i2\pi fm\Delta t}$ for m=0 ... p-1; $\sigma^2$ is a random noise term added to the diagonals; $\sigma^2$ governs how deep the frequency notch will be (for small $\sigma^2$ the notch will be deep and for a larger $\sigma^2$ the notch will be shallow); and the width of the notch is controlled by the number (p) of coefficients generated. Details of this step are given in U.S. Pat. No. 4,853,903 to Linville, Shirley and Griffith, 1989, the teaching of which is incorporated herein by reference.

At step 280 the filter, a(m), is convolved with the data D(t,k) in accordance with the following equation:

$$D'(t,k) = \sum_{m=0}^{p-1} a(m)D(t-m,k) \quad \text{for } t = 1 \ldots j \quad (3)$$

where D'(t,k) is the filtered data and j is the number of time samples.

Proceeding to step 290, if the bandlimit of the coherent noise is not reached the method goes back to step 230 where the next wavenumber is selected. If the bandlimit of the data has been reached the method proceeds to step 300.

Figure 4:
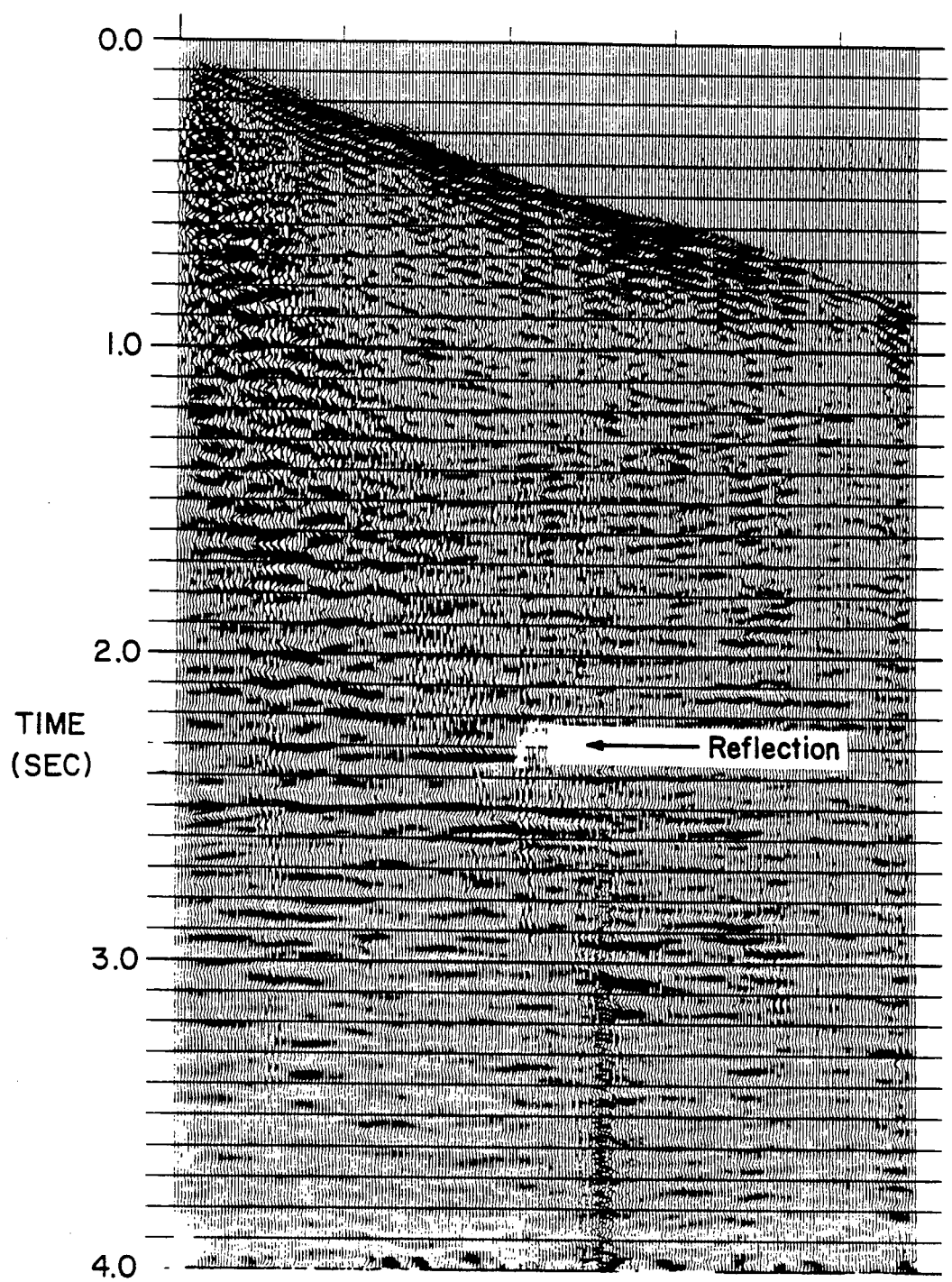
FIG. 4 illustrates the t-x domain shot record in FIG. 2 after the coherent ground roll has been removed in accordance with the method of FIG. 1.
Figure 5:
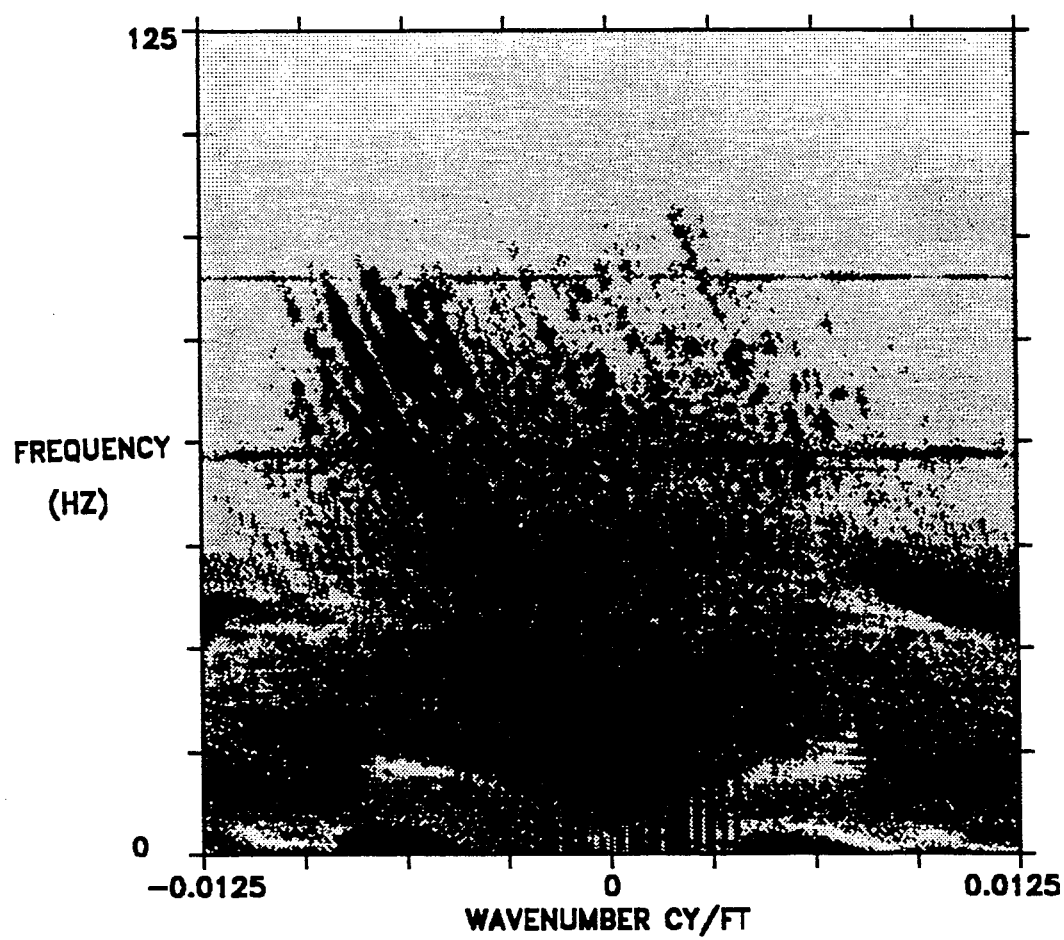
FIG. 5 illustrates the f-k spectrum of the t-k domain filtered shot record in FIG. 4.

At step 300 each of the filtered traces, D'(t,k), is inverse Fourier transformed back to the t-x domain, d'(t,x), using an inverse fast Fourier transform represented by the following equation:

$$d'(t,x) = \frac{1}{n} \sum_{k=0}^{n-1} D'(t,k)e^{i2\pi kx/n} \quad (4)$$

where d'(t,x) represents the data after coherent noise removal. In FIG. 4 the shot record in FIG. 2 has been filtered to remove the dispersive Rayleigh energy in both the left and right quadrants of the f-k spectrum. After this step the method proceeds to step 310 where it terminates. In FIG. 5 the f-k spectrum of the filtered shot record in FIG. 4 shows that the dispersive Rayleigh energy has been removed.

Thus, there has been described and illustrated herein a method for removing coherent noise from seismic data by computing t-k representations of the data and removing selected frequencies from the seismic data corresponding to either constant velocity or dispersive coherent noise. However, those skilled in the art will recognize that many modifications and variations besides those specifically set forth may be made in the techniques described herein without departing from the spirit and scope of the invention as set forth in the appended claims.

We claim:

1. In seismic exploration wherein seismic sources are activated at spaced locations along a line of exploration and the amplitude of reflections from subsurface formations are recorded as a function of time and distance along said line of exploration to produce a time-distance array of seismic traces, said traces comprised of a seismic signal component and a coherent noise component, a method of processing said seismic traces to remove said coherent noise component, comprising the steps of:
   a) transforming said time-distance array of seismic traces into a time-wavenumber domain,
   b) determining a wavenumber at which said coherent noise resides,
   c) determining a frequency corresponding to the coherent noise component at the determined wavenumber,
   d) filtering said time-wavenumber domain of seismic traces to remove the determined frequency, and
   e) transforming said filtered time-wavenumber domain of seismic traces back to the time-distance domain to produce a time-distance array of seismic traces with said coherent noise component removed.

2. The method of claim 1 wherein said frequency is determined for dispersive coherent noise by selecting from frequencies derived from a curved trend of said coherent noise on a frequency-wavenumber spectrum of said array of seismic traces.

3. The method of claim 1 wherein said frequency is determined for linear coherent noise from the linear trend of said coherent noise on a frequency-wavenumber spectrum of said array of seismic traces in accordance with the following:

$$f = kv,$$

where k is the wavenumber, f is the frequency, v is the velocity of the coherent noise.

4. The method of claim 1 wherein said filtering step comprises:
   a) determining a least squares filter for removing said determined frequency from the time-wavenumber domain of seismic traces, and
   b) convolving said least squares filter with the time-wavenumber domain of seismic traces to remove the determined frequency.

5. In seismic exploration wherein seismic sources are activated at spaced locations along a line of exploration and the amplitude of reflections from subsurface formations are recorded as a function of time and distance along said line of exploration to produce a time-distance array of seismic traces, said traces comprised of a seismic signal component and a coherent noise component, a method of processing said seismic traces to remove said coherent noise component, comprising the steps of:
   a) transforming said time-distance (t-x) array of seismic traces with a fast Fourier transform into a time-wavenumber (t-k) domain D(t,k) in accordance with the following:

$$D(t,k) = \sum_{x=0}^{n-1} d(t,x)e^{-i2\pi kx/n}$$

where d(t,x) are the seismic traces in the t-x domain for x=1...n, where n is the number of seismic traces; t=0, ..., j; and j is the number of time samples, D(t,k) are the seismic traces in the t-k domain, where k=0...n,
   b) determining a wavenumber within a range wherein said coherent noise component resides, said wavenumber range being dependent on the bandwidth of said coherent noise component,
   c) determining a frequency corresponding to the coherent noise component at the determined wavenumber,
   d) determining a least squares filter a(m) for removing said determined frequency from the time-wavenumber domain D(t,k) in accordance with the following:

$$\begin{bmatrix} R(0)+\sigma^2 & R^*(1) & \ldots & R^*(p-1) \\ R(1) & R(0)+\sigma^2 & \ldots & R^*(p-2) \\ \cdot & \cdot & & \cdot \\ \cdot & \cdot & & \cdot \\ \cdot & \cdot & & \cdot \\ R(p-1) & R(p-1) & \ldots & R(0)+\sigma^2 \end{bmatrix} \begin{bmatrix} a(0) \\ a(1) \\ \cdot \\ \cdot \\ \cdot \\ a(p-1) \end{bmatrix} = \begin{bmatrix} 1 \\ 0 \\ \cdot \\ \cdot \\ \cdot \\ 0 \end{bmatrix}$$

where * means complex conjugate, $R(m) = e^{i2\pi fm\Delta t}$ for m=0...p−1; $\sigma^2$ is a random noise term added to the diagonals; $\sigma^2$ governs how deep the frequency notch will be (for small $\sigma^2$ the notch will be deep and for a larger $\sigma^2$ the notch will be shallow); and the width of the notch is controlled by the number (p) of coefficients generated,
   e) convolving said least squares filter a(m) with the D(t,k) domain of seismic traces to remove the determined frequency in accordance with the following:

$$D'(t,k) = \sum_{m=0}^{p-1} a(m)D(t-m,k) \quad \text{for } t=1\ldots j$$

where D'(t,k) is the filtered data and j is the number of time samples, and
   f) transforming said filtered D'(t,k) (t,k) domain seismic traces with a fast Fourier transform back to the time-distance (t-x) domain to produce a time-distance (t-x) array of seismic traces with said coherent noise component removed in accordance with the following:

$$d'(t,x) = \frac{1}{n}\sum_{k=0}^{n-1} D'(t,k)e^{i2\pi kx/n}$$

where d'(t,x) represents the data after coherent noise removal.

6. The method of claim 5 wherein steps (b) through (e) are reiterated for different wavenumber determinations until the bandlimit of the coherent noise component is reached.

7. The method of claim 5 wherein said frequency is determined for dispersive coherent noise by selecting from frequencies derived from a curved trend of said coherent noise on a frequency-wavenumber spectrum of said array of seismic traces.

8. The method of claim 5 wherein said frequency is determined for linear coherent noise from the linear trend of said coherent noise on a frequency-wavenumber spectrum of said array of seismic traces in accordance with the following:

$$f = kv,$$

where k is the wavenumber; f is the frequency; and v is the velocity of the coherent noise.

* * * * *